United States Patent Office 3,149,924
Patented Sept. 22, 1964

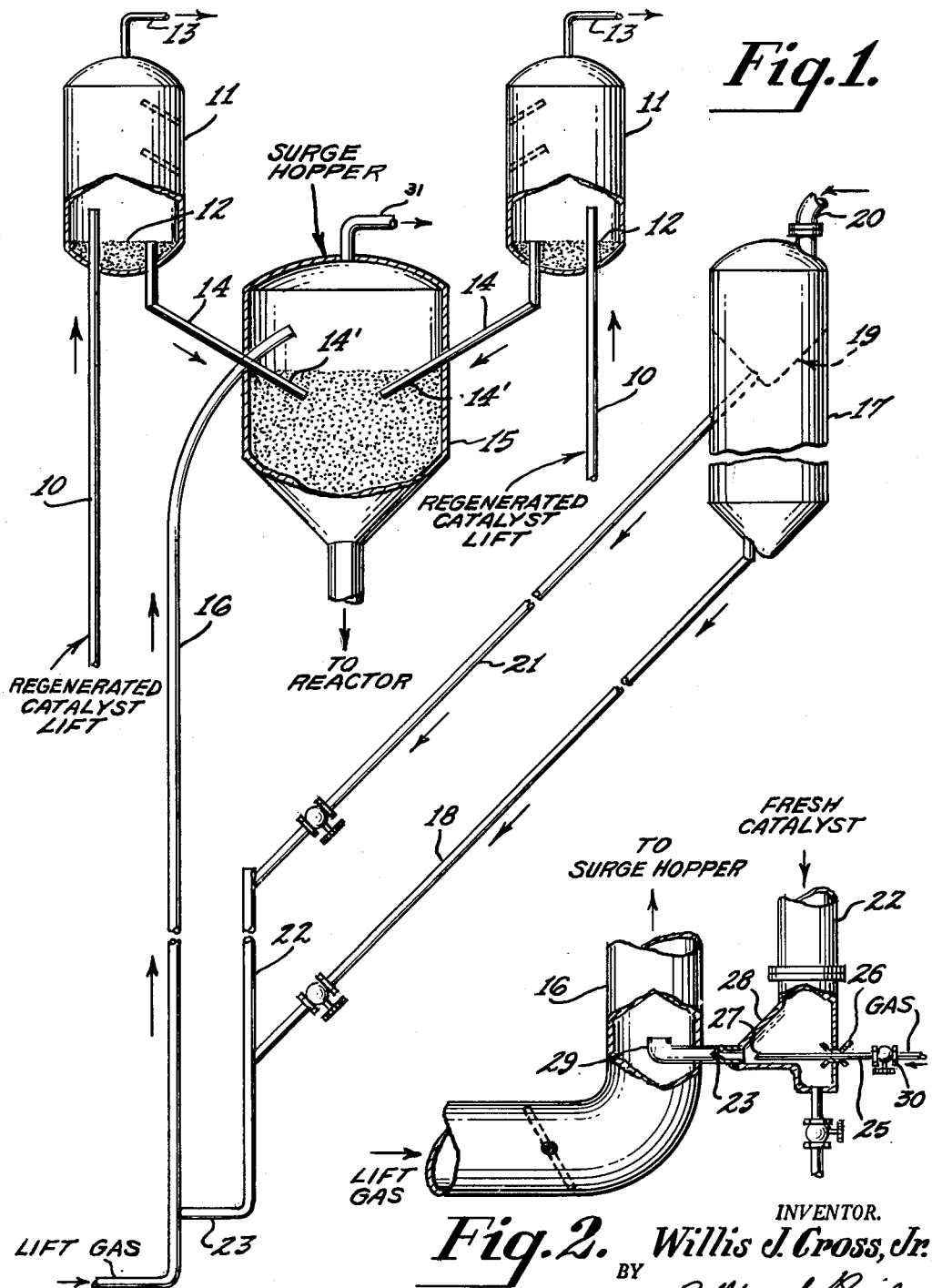

3,149,924
CONTACT MASS MAKE-UP
Willis J. Cross, Jr., Media, Pa., assignor to Air Products and Chemicals, Inc., a corporation of Delaware
Filed Mar. 1, 1961, Ser. No. 92,705
3 Claims. (Cl. 23—288)

The present invention relates to moving compact bed hydrocarbon conversion systems employing granular catalyst or other porous or adsorbent contact mass, and is particularly concerned with the addition of regulated quantities of such contact mass to a circulating body thereof, generally to replace removed portions.

In such systems the granular contact mass, which may be catalytic, descends through a downflow path as a compact bed or beds through one or more fluid contacting zones, and at the bottom of the downflow path the granular mass is raised to an elevated position for repetition of its downward movement. In typical hydrocarbon conversion systems, the fluid contacting zones will ordinarily comprise principally a hydrocarbon conversion zone wherein the granular mass is contacted with hydrocarbon charged, and a regeneration or heating zone, wherein for instance, the granular mass containing coke deposit, is subject to contact with oxygen-containing gas for effecting combustion of the coke. In systems of this type it is generally found necessary to add a minor quantity of contact mass to the circulating body thereof, which in part at least is to replace that portion removed as fines resulting from attrition; or if the granular mass is catalytic and attrition is extremely small, a portion of the mass may be removed in granular form to permit replacement thereof by fresh catalyst or catalyst of higher activity in order to maintain desired equilibrium activity. The present invention is particularly concerned with improvements in the manner of adding so-called "make-up" catalyst or other contact mass requiring replacement in the system. Since the problems encountered are more acute in the case of the more costly contact mass which is catalytically active, the addition of make-up catalyst is particularly referred to in the description which follows; it being understood, however, that the invention is not thereby limited and is applicable in connection with the addition of non-catalytic contact material to replace that lost through attrition or otherwise.

In circulating systems of the type under discussion, the catalyst or other contact mass is maintained at or subjected to elevated temperatures in the order of 800° F. and above. One of the major problems currently encountered in such systems is that resulting from attrition of the catalyst, particularly in those systems employing a gas lift for elevation of the catalyst to the top of its downflow path during the course of circulation. The factors contributing to total attrition in the system are many and various. It has now been found that a considerable portion of the total attrition arising during operation may occur as a result of the prevailing manner of adding make-up catalyst thereto.

In U.S. Patent 2,786,800, means are described for continuously adding fresh make-up catalyst to the circulating catalyst system at controlled rates, instead of by periodic batch addition as theretofore generally practiced. In the system there described, the make-up catalyst is fed by gravity from the make-up supply hopper to the elutriator bed or to the return line from the elutriator, in either case under control of a metering orifice or mechanical flow regulating device. The make-up catalyst, alone or together with elutriated catalyst being returned to the system, is supplied to the top of the kiln section or to some other convenient point in the main body of circulating catalyst.

In those circulating catalyst installations in which the quantity of make-up catalyst to be added per hour is relatively small, as in the order of 1 part in 5,000 to 10,000 of the hourly circulation rate, difficulties have been encountered in the control of the make-up rate through fixed orifices, while mechanical metering devices are cumbersome in operation and are subject to mechanical failures.

By the present invention an improved arrangement is provided for supplying make-up catalyst to the main body of circulating catalyst in the system to replace that lost through attrition and/or that removed from the system to maintain the desired equilibrium activity. In accordance with this invention, the make-up catalyst is caused to gravitate in compact flow from its supply hopper through a downflow transfer conduit. At the bottom terminus of the transfer conduit a short communicating branch line extends laterally therefrom terminating in a discharge outlet within a gas lift conduit which is separate from the one or more lift conduits employed in circulating the main body of catalyst through the system. Suitable lift gas flows at a controlled rate through the lift conduit from a point upstream of the discharge outlet of the branch line. A retractible gas nozzle, of smaller diameter than the branch line, is arranged along the axis of the branch line, the nozzle passing diametrically through the wall of the transfer conduit opposite the intersection of the branch line with said conduit, so that the discharge outlet of the nozzle can be moved laterally toward and away from the inlet of the branch line. The catalyst is thus ejected from the branch line into the lift conduit in regulated quantity under control of (1) the gap provided between the outlet of the gas nozzle and the branch line inlet and (2) by the rate at which gas is discharged through the nozzle; these controls being independent of the supply of the main stream of lift gas to the lift conduit. The lift conduit discharges into a suitable hopper wherein it becomes admixed with the main body of catalyst that is being circulated in the system.

The operation of the invention and certain of the advantages thereof will be understood from the detailed description which follows read in connection with the accompanying drawings. In these drawings:

FIGURE 1 is a schematic flow diagram illustrating the application of the invention in one type of conventional gas lift hydrocarbon conversion system;

FIGURE 2 is a fragmentary view in elevation of a portion of the make-up lift conduit and of the communicating catalyst supply conduit.

The system illustrated in FIGURE 1 is of the type described in general in Shirk, U.S. Patent No. 2,702,207, issued February 15, 1955. The system there described in detail utilizes a plurality of catalyst lifts, represented at 10 in FIGURE 1, which discharge freshly regenerated catalyst into a number of disengager vessels 11 arranged above the reactor system (not shown). In the disengager vessels the lift gas is separated from the granular catalyst particles, and these particles fall on to the bed of catalyst 12 at the bottom of each disengager vessel, the lift gas being discharged through an appropriate outlet 13. Feeder conduits 14 transfer the catalyst from the several vessels 11 into a common surge hopper 15, from which the catalyst passes by gravity in its downflow path (not shown) sequentially (1) through a hydrocarbon conversion reactor of the compact moving bed type, (2) is purged and (3) descends into and through a kiln section wherein the carbonaceous deposit is burned off the catalyst, restoring the same for repetition of the cycle. In the preferred embodiment conduits 14 are provided with an extension 14' within the vessel 15 in the form of an open U-shaped chute, which enables discharge of catalyst over the shallow side walls thereof onto the upper surface of the surge bed.

While the invention has been illustrated as applied to a system utilizing a number of lift disengager vessels supplying a common surge hopper, it will be understood that the application of the novel features of the invention is not limited to such system. Thus, the invention is equally applicable to a hydrocarbon conversion system employing a single lift conduit for circulation of the main body of catalyst, such as is illustrated in Ivey et al., U.S. Patent No. 2,624,695 of January 16, 1953; or to a system in which a plurality of gas lift conduits discharge into a single disengager vessel, as is illustrated in Ardern, U.S. Patent No. 2,663,595 of December 22, 1953. Moreover, as shown in these patents, the use of a separate surge hopper 15 may be omitted and the surge bed may be provided in the disengager vessel 11 or within an upper compartment of the hydrocarbon conversion reactor. In any event the make-up catalyst in practice of the present invention, is added to the main body of circulating catalyst through a separate lift conduit 16 (FIGURE 1), discharging above the surge bed supplying the downflow path of catalyst, regardless of whether the surge bed is at the top of a reactor, within a lift disengager vessel, or in a separate vessel in communication therewith.

At 17 there is shown a catalyst storage hopper into which catalyst may be withdrawn during a shut-down period or the like, means (not shown) being provided for transfer of the catalyst thereto from a high point in the system. Catalyst from storage hopper 17 is returned to the system through suitable piping 18. Storage hopper 17 is partitioned to provide an upper storage compartment 19 for temporarily retaining the reservoir of make-up catalyst to be added to the system, an adequate supply being furnished periodically through inlet 20. Catalyst is withdrawn from compartment 19 by a line 21 which discharges into an upright transfer conduit 22, through which the catalyst gravitates in compact flow.

Referring now to FIGURE 2, there is shown at the bottom of conduit 22 a laterally-communicating branch line 23 which discharges into a make-up gas lift conduit 16, branch line 23 being provided with an upturned elbow 29 oriented to discharge solids axially in the direction of catalyst flow through conduit 16. A gas nozzle 25 passes through a gland 26 in the wall of conduit 22 at a position axially aligned with and diametrically opposite the opening into branch line 23. The nozzle 25 is of smaller diameter than the line 23 and is arranged so that the tip 27 of the nozzle can be moved into the flared inlet 28 of line 23 for a short distance and retracted therefrom as desired. The positioning of the tip 27 with respect to the inlet of line 23 operates as a general control device, in setting the thickness of the layer of catalyst in front of tip 27. As the tip 27 is retracted from the inlet a thicker layer of catalyst is thereby provided in front of the tip. The positioning of the tip, therefore, sets the general limits of the rate of flow of catalyst through line 23.

Gas from a suitable source is passed through nozzle 25 under control of valve 30. The operation of valve 30 provides a fine adjustment of the rate that gas is discharged from tip 27, thereby enabling precise control of the rate of catalyst discharge from branch line 23 within the broader range fixed by the positioning of tip 27.

In a hydrocarbon cracking system circulating catalyst at the rate of about 600 tons per hour, the make-up catalyst rate may generally be in the range of about 150–200 pounds per hour. For a system of this type, a practical design could employ a lift conduit 16 for the make-up catalyst of about 6 inch internal diameter and a transfer line 22 of about 3 or 4 inch diameter having a horizontal branch 23 of about 2 inch diameter. The gas nozzle 25 will be of a diameter (internal) of about half that of the branch 23. Gas may be supplied to nozzle 25 at a pressure of 30 to 60 p.s.i.g. upstream of gland 26. Under these conditions the position of tip 27 and the opening of valve 30 can be readily set to provide the desired rate of discharge of make-up catalyst through line 23 into lift conduit 16. It will be seen that at the indicated low make-up rate the catalyst will dribble or fountain out of the outlet of line 23 at low velocity and be picked up by the main gas stream passing through lift conduit 16, the velocity of such stream being sufficiently in excess of supporting velocity to transport the catalyst through the conduit and discharge the same into hopper 15. The gas being disengaged by venting through outlet 31, the catalyst will fall onto the surface of the compact bed in the bottom of hopper 15, and become admixed with the main body of catalyst supplied to the bed.

Obviously many modifications and variations of the invention as hereinbefore set forth may be made without departing from the spirit and scope thereof, and therefore only such limitations should be imposed as are indicated in the appended claims.

What is claimed is:

1. In a system circulating granular contact mass through a downflow path including a reaction zone and returning the main body of such contact mass to a feed hopper at an upper level for repeated downward flow, means for supplying a minor make-up quantity of fresh granular material to said main body at controlled rates; said means comprising: an independent upright lift conduit discharging at its upper end into said feed hopper, an upright solids supply conduit adjacent to said independent lift conduit, a substantially horizontal branch line providing communication between said supply conduit and said lift conduit; a gas nozzle concentric with said branch line arranged for lateral movement along the axis of said branch line to a position approximate the inlet of said branch line, said gas nozzle being of smaller diameter than said branch line, said gas nozzle being provided with control means for fixing the rate of gas discharged into said branch line, and separate means for supplying lift gas to said independent lift conduit at a location below said branch line.

2. In a hydrocarbon conversion system circulating granular catalyst, said system, including (1) at least one pneumatic lift for returning the main body of such catalyst to an upper level for repeated flow through a downflow path which comprises at least one reaction zone and (2) a surge hopper supplying catalyst to said downflow path; in combination therewith (3) means for supplying a small quantity of fresh make-up catalyst to said surge hopper for admixture with the main body of circulating catalyst therein; said means (3) comprising an independent pneumatic lift discharging into said surge hopper and a feeder device for continously introducing small portions of fresh make-up catalyst into said independent lift, said feeder device comprising:

(a) an upright transfer conduit substantially parallel, at least along the lower portion thereof, to the longitudinal axis of said independent lift conduit, (b) a substantially horizontal branch line providing flow communication between said transfer conduit and said independent lift conduit, said branch line terminating in an upturned elbow within said independent lift conduit.

(c) a retractible gas nozzle concentric to said branch line and capable of being positioned at various locations approximate the inlet to said branch line, thereby establishing the relative position of the discharge outlet of said gas nozzle with respect to the body of catalyst gravitating into said branch line from said transfer conduit, (d) control means associated with said gas nozzle for regulating the rate of gas passing therethrough into said branch line, and (e) separate means for supplying lift gas to said independent lift conduit;

whereby the quantity of catalyst discharged from said branch line into said independent lift conduit is controlled by the position of the gas nozzle with respect to the inlet to the branch line and by the rate of gas supply through said gas nozzle.

3. A system for continuously circulating a main body of granular contact mass and for adding to such main body small controlled amounts of such granular contact mass for replacement of portions removed therefrom, said system comprising:
(1) at least one lift conduit for elevating the main body of circulating contact mass to an upper level, said lift conduit discharging gas and solids into a disengager vessel,
(2) means for transferring the contact mass by downward flow from the disengager vessel to a surge hopper onto a compact moving bed of such contact mass within the surge hopper,
(3) an independent lift conduit for discharging make-up granular contact material directly into said surge hopper,
(4) a substantially horizontal branch line discharging make-up granular material into said independent lift conduit, the opposite inlet end of said branch line being in open communication with and arranged to receive granular material by gravity flow from a supply source;
(5) a movable gas nozzle arranged to discharge a minor quantity of impelling gas into said branch line for moving granular material therethrough into said independent lift conduit, and
(6) separate means for supplying a major quantity of lift gas to said independent lift conduit.

References Cited in the file of this patent

UNITED STATES PATENTS

| | | |
|---|---|---|
| 1,319,193 | Porat | Oct. 21, 1919 |
| 1,339,977 | Pruden | May 11, 1920 |
| 1,475,502 | Manning | Nov. 27, 1923 |
| 1,647,317 | Selden | Nov. 1, 1927 |
| 1,789,812 | Frazer | Jan. 20, 1931 |
| 2,371,477 | Souders et al. | Mar. 13, 1945 |
| 2,379,195 | Simpson et al. | June 26, 1945 |
| 2,534,092 | Wilde | Dec. 12, 1950 |
| 2,624,695 | Ivery et al. | Jan. 6, 1953 |
| 2,663,595 | Ardern | Dec. 22, 1953 |
| 2,702,207 | Shirk | Feb. 15, 1955 |
| 2,781,300 | Hoge | Feb. 12, 1957 |
| 2,786,800 | Myers | Mar. 26, 1957 |
| 2,850,329 | Pyle et al. | Sept. 2, 1958 |
| 2,899,374 | Gomory | Aug. 11, 1959 |